J. Madden,
Bread-Cutter,
№ 67,325. Patented July 30, 1867.
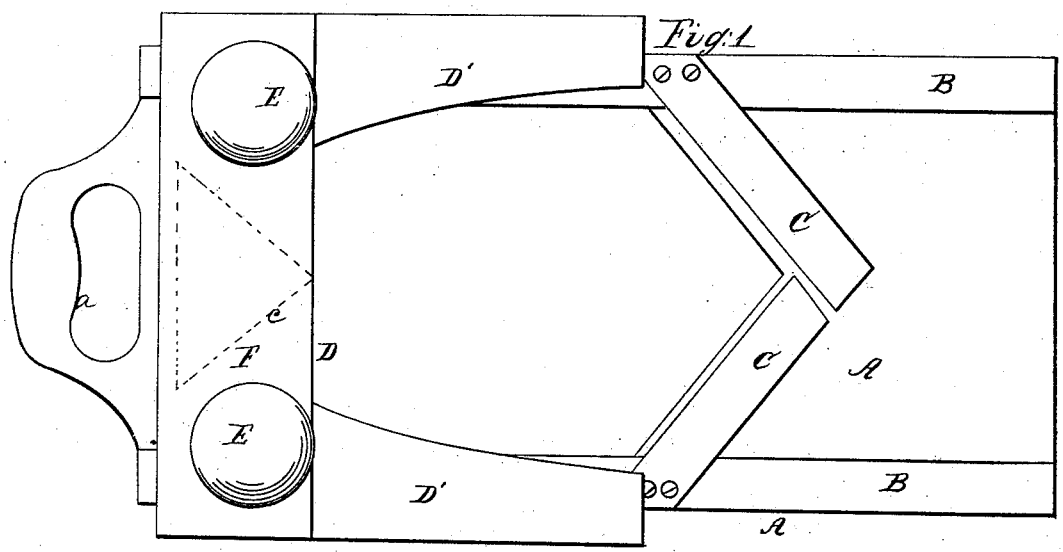
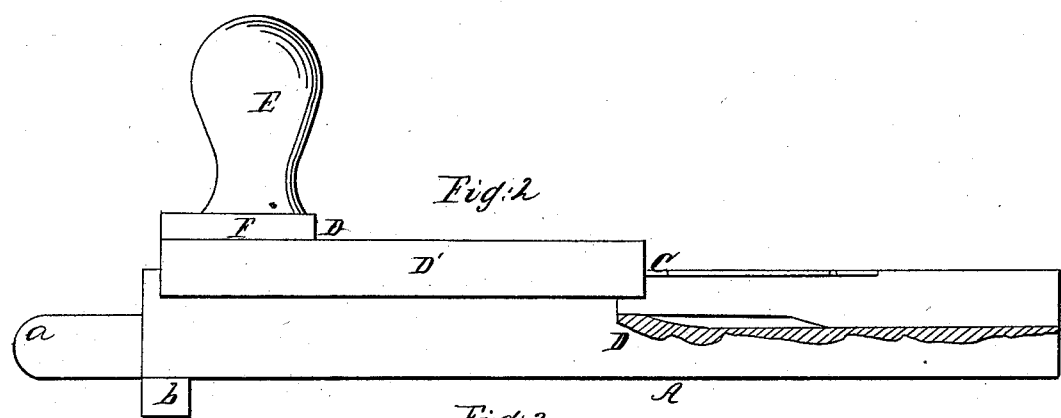
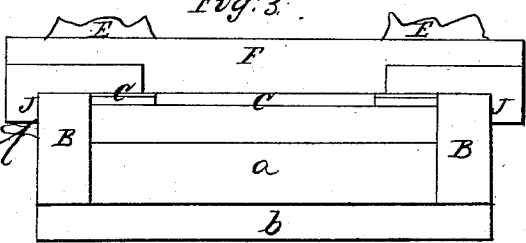
Witnesses
A. G. Hiserot
J. Holmes
Inventor
John Madden

United States Patent Office.

JOHN MADDEN, OF CLEVELAND, OHIO.

*Letters Patent No. 67,325, dated July 30, 1867.*

---

IMPROVED BREAD-CUTTER.

---

*The Schedule referred to in these Letters Patent and making part of the same.*

---

TO ALL WHOM IT MAY CONCERN:

Be it known that I, JOHN MADDEN, of Cleveland, in the county of Cuyahoga, and State of Ohio, have invented certain new and useful improvements in Bread-Cutter, &c., being an improvement on a patent granted to me April 2, 1867; and I do hereby declare that the following is a full and complete description of the same, reference being had to the accompanying drawings, making a part of this specification, in which—

Figure 1 is a top view.

Figure 2 is a side view.

Figure 3 is an end view.

Like letters of reference refer to like parts in the views.

In the drawings, A represents the frame to which the knives or blades are attached, which consists of the table A', with side pieces or boards B, a handle, $a$, at one end of the frame, and on the under side a strip, $b$, fig. 2, which is to come against the edge of the table or shelf on which the frame is placed to be used, so as to prevent its moving about. The knives C C, of which there may be one or more, are secured as shown in fig. 1, to the side pieces B, being placed in an angular position, as represented. D is a sliding frame, provided with arms D' and handles E, which project up from the head F, shown in fig. 2, the arms projecting from under this head, the inside of them being curved, as in fig. 1. Under the head F, which connects the arms, is a piece, $c$, in the form of a triangle, being made of leather or any suitable material that will not injure the knives by coming in contact with them in cutting the bread, indicated by the dotted lines, fig. 1. Immediately below the blades the table A' above referred to is cut down, forming a shoulder, I, fig. 2, thus making said table, from the edge of the blades to the end, lower than that on the other side of the shoulder, on which the bread is laid to be cut. The table is cut down in this way, so that the slice, when cut, will drop away from the blades, and the next slice, when cut, will pass over the shoulder I without crowding, and push the first slice off of the table. When the bread is to be cut the loaf is placed between the arms of the sliding frame D, and the frame pushed towards the knives, which frame is held in place when moving by means of the shoulders J, fig. 3, formed by the arms over the side pieces B. As the frame is moved along the knives will cut the bread straight and even, and, by means of the piece under the head F, conforming with the angle of the knives, the slice will be cut entirely off, leaving it under the knives on the table A', beyond the shoulder I referred to. The frame can then be moved back, and the next slice, when being cut, will push the one already cut off from under the knives, and so on, each consecutive slice pushing the one cut before it from the table A', and if thought desirable, the table from the end of the knives can be cut entirely away, and the slice will then drop as soon as it is cut.

Some of the advantages of this improvement over my former patent are as follows: The blades or knives in my former patent of April 2 are placed in a vertical position, and by this means, when in use, the bread has to be pushed laterally at the same time it is being pushed towards the blades, and as the slices are cut they will fall in any direction, and be liable to get in the way of the frame and loaf. Another trouble: when the loaf is nearly all cut, it is difficult to hold it, and the fingers of the person holding it are liable to be cut; but with the improvements above described all these inconveniences and disadvantages are overcome, as in this the knives are in a horizontal position, and the loaf is held between the arms D', as stated, and all that is to be done is to push the frame D towards the said knives, which will cut the bread, and the slices, when cut, will be moved out under the blades on the table A'. Thus it is very convenient, cheap, and easily handled.

What I claim as my improvement, and desire to secure by Letters Patent, is—

1. Chamfering the bottom of the table immediately under the horizontal knife C, in combination with said knife, for the purpose and in the manner substantially as set forth.

2. The horizontal knives C, and table A', in combination with the sliding frame, constructed and arranged in relation to each other as and for the purpose set forth.

JOHN MADDEN.

Witnesses:
 FRANK ALDEN,
 J. HOLMES.